US007888130B2

(12) United States Patent
Wuske et al.

(10) Patent No.: US 7,888,130 B2
(45) Date of Patent: Feb. 15, 2011

(54) TEST CASSETTE FOR FLUID ANALYSES

(75) Inventors: Thomas Wuske, Bad Malente (DE); Rainer Polzius, Lübeck (DE); Jessika Mahn, Ahrensböck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 1120 days.

(21) Appl. No.: 11/560,140

(22) Filed: Nov. 15, 2006

(65) Prior Publication Data

US 2007/0154350 A1 Jul. 5, 2007

(30) Foreign Application Priority Data

Jan. 3, 2006 (DE) ....................... 10 2006 000 677

(51) Int. Cl.
*G01N 21/77* (2006.01)

(52) U.S. Cl. ........................... 436/169; 422/55; 422/56; 422/57; 422/58; 422/59; 422/60; 422/61; 422/62; 422/65

(58) Field of Classification Search ................... 422/55, 422/56, 57, 58, 59, 60, 61, 62, 65; 436/169
See application file for complete search history.

(56) References Cited

U.S. PATENT DOCUMENTS 5,344,754 A * 9/1994 Zweig ........................... 435/4
6,017,494 A 1/2000 Ashihara et al.
6,627,152 B1 9/2003 Wong
6,726,879 B2 4/2004 Ng et al.
2002/0001854 A1* 1/2002 Lee ............................ 436/518
2002/0114735 A1* 8/2002 Markart ..................... 422/68.1
2003/0021726 A1 1/2003 Wu et al.
2003/0049849 A1* 3/2003 Mori et al. .................... 436/46
2003/0064526 A1* 4/2003 Niedbala et al. ............ 436/165
2005/0106750 A1 5/2005 Tung et al.
2005/0186111 A1 8/2005 Wang et al.

FOREIGN PATENT DOCUMENTS

DE 694 04 026 T2 10/1997
DE 103 28 984 B4 2/2004
EP 0 965 042 B1 12/1999
WO WO 95/07659 3/1995
WO WO 00/05579 2/2000
WO WO 2005/050165 A2 6/2005
WO WO 2005/066327 A1 7/2006

* cited by examiner

*Primary Examiner*—Lyle A Alexander
*Assistant Examiner*—Dennis M White
(74) *Attorney, Agent, or Firm*—McGlew and Tuttle, P.C.

(57) ABSTRACT

A test cassette for the detection of analytes from fluid samples is provided which has a housing (1, 2) with an inlet opening and with a reservoir for receiving a fluid sample containing the analyte. A separate carrier platform (3) can be horizontally displaced in the housing (1, 2), for fixing one or more flexible, strip-like, capillary-active detection elements. The carrier platform (3) in the housing (1, 2) is designed such that the capillary-active detection elements are deflected from the longitudinal direction of the strips and dip into the fluid sample in the reservoir during a lateral motion of the carrier platform (3).

11 Claims, 13 Drawing Sheets

TEST CASSETTE FOR FLUID ANALYSES

CROSS REFERENCE TO RELATED APPLICATIONS

This application claims the benefit of priority under 35 U.S.C. §119 of German Patent Application DE 10 2006 000 677.1 filed Jan. 3, 2006, the entire contents of which are incorporated herein by reference.

FIELD OF THE INVENTION

The present invention pertains to a test cassette for use for sample preparation, conditioning and the subsequent automatic biochemical analysis of a fluid matrix for a plurality of analytes in one operation. The test cassette contains special interfaces for connecting such a device for obtaining a sample for an automatic device-based evaluation of the analysis.

BACKGROUND OF THE INVENTION

A plurality of test procedures, which require rapid analysis at the site of occurrence, at the individual or at the object to be measured in order to shorten reaction times or to facilitate decision-making that justify further, at times expensive special analyses, are known in both environmental analytical chemistry, forensic chemistry and clinical diagnostic procedures. Such tests are increasingly also carried out by lay persons in order to save costs or to directly satisfy the need for information. This circumstance substantiates the challenge to simplify complex analytical operations to the extent that a generally understandable handling is achieved at a low operator level.

Rapid tests, which are based on test strips, which perform one-step analyses of individual substances autonomously with a sample fed manually and a visual or device-based evaluation, correspond to the state of the art.

This procedure is difficult in the case of more complex biochemical analytical procedures when multi-step sample preparations precede an analysis and the sample thus processed must subsequently be fed to the analytical unit. If additional substances must be analyzed in a single sample with a defined offset in time and possibly under regulated thermal conditions, an on-site test can usually be carried out mostly with a great effort only. Additional operations, such as reaction or connection steps, require either trained operating personnel or stationary automatic laboratory analyzers, which are equipped with corresponding robotics, compartmentalization and air conditioning. Analytical processes thus become either too cumbersome and too error-prone or too expensive to continue to be still able to claim being a rapid on-site test. The most important factors, which increase the complexity of the process for the user to a considerable extent, are reproducible sample preparation, fluid management and thermal management of a sample. It is important in terms of avoiding errors, specially when a process shall also be able to be used as a mobile process, for example, by the police during use in the field, to design the process such that it comprises the smallest possible number of handling steps and the simplest possible handling steps for the user, combined with automatic processes. Experience has shown that a minimum of manual procedures leads to a maximum of precision in the result.

An example of the automation of fluid management and sample processing is shown by EP 0 965 042 B1. It describes an immunochemical process, which is characterized by a high degree of segmentation of the sample processing process and the reaction pathway. The individual process steps are made possible by the connection of independent components with one another via mobile parts. A large number of individual parts are needed to transfer a sample, which is located in a test cassette. The sample is connected to the analytical element via mobile components. However, it is a one-analyte system, which does not take into account the different ways of processing of different analytes contained in a sample in one process.

SUMMARY OF THE INVENTION

It is desirable in the sense of a maximum level of integration of sampling, sample preparation and analytical functions for fluid samples to make available a test cassette that makes possible, on the one hand, necessary processes of sample preparation, conditioning and signal evaluation via suitable interfaces and, on the other hand, the transfer of the sample to parallelized one-step analysis pathways.

Furthermore, a process shall be made available for the detection of analytes from fluid samples by means of a test cassette.

According to the invention, a test cassette is provided for the detection of analytes from fluid samples. The test cassette includes a housing with an inlet opening and with a reservoir for receiving a fluid sample with the analyte. A separate carrier platform is positioned to be displaced horizontally in the housing. The carrier platform has a strip mount for fixing one or more flexible, strip-like capillary-active detection elements. The capillary-active detection elements are deflected from the longitudinal direction of the strip during a lateral motion of the carrier platform and dip into the fluid sample in the reservoir.

According to another aspect of the invention, a process is provided for detecting analytes from fluid samples by means of a test cassette. The process includes providing a housing with a reservoir and inserting a fluid sample into the reservoir. A plurality of flexible, strip-like capillary-active detection elements, for analytes, are provided on a carrier platform in the housing. The detection elements are deflected such that the detection elements dip into the reservoir for receiving the fluid sample. A biochemical detection reaction is measured by means of a reading/evaluating device on the capillary-active detection elements to determine the concentration of the analytes.

Simultaneous detection of a plurality of analytes from a single sample or the detection of such samples offset in time is possible by means of this test cassette. The test cassette has a housing with an access to the sample via a sample opening or, as an alternative, for receiving a supplementary module for sampling and sample preparation, a reagent depot component anchored in the sample opening of the housing, a carrier platform for test strips, which is mounted and is displaceable in the housing, as well as capillary-active detection elements, whose position is partially stabilized on the carrier platform. The capillary-active detection elements are especially test strips. The housing comprises a plurality of parts that can be put together, preferably a lower part and an upper part, which form one unit with two openings, namely, with an access for sample fluid with a supplementary module for sampling and sample preparation, and with an outlet for the extractable carrier platform.

A sample tray for holding and tempering a fluid sample, which is separated by a partition from a mount for a sliding carrier platform, is located in the lower part of the housing. The sample tray can be heated or cooled from the outside via the positive-locking connection to a tempering element.

The upper part of the test cassette additionally contains rigid guide elements, which are preferably arc-shaped, for deflecting the capillary-active detection elements into the sample tray for fluid samples. As an alternative, there are openings or opening flaps in the upper part of the test cassette, which makes possible the engagement of guide elements for lowering the capillary-active detection elements.

The carrier platform is the transport vehicle and the support platform for the capillary-active detection elements, which can be displaced from a secured inoperative position into different operating positions in order to establish and interrupt the fluid contact between the sample fluid in the sample tray and the capillary-active detection elements as well as to reach a measuring position for the device-based detection of the signals of the capillary-active detection elements, which signals are generated, for example, by a change in color. The carrier platform comprises a plurality of mounts for capillary-active detection elements, which are separated from one another, in order to prevent capillary-active detection elements from mutually affecting one another ("crosstalk"). The carrier platform has special guide structures to thus enable different operating positions in front of and behind the inoperative position to be reached with little effort. The inoperative position is a locked basic position before the beginning of analysis, so that the test cassette is preferably closed, secured against manipulation, and protected from dirt particles and rainwater. It is characterized in that, on the one hand, the carrier platform ends flush with the housing and is interlocked with the housing in a vibration-proof manner. The securing can be released only by means of an external releasing device, for example, one which is a part of a reading device. The motion of the carrier platform from the inoperative position into an operating position for the signal evaluation takes place by means of an external actuator and the triggering of a release mechanism. The capillary-active detection elements consist, in general, of capillary-active carrier materials or a composite of different capillary-active carrier materials or microfluidic channels, which make fluid transport possible in an autonomous manner after fluid contact has been established. These are preferably porous layers of polymers or bonded and pressed fibers, which have depot zones or detection zones. The capillary-active detection elements consist, in particular, of a test strip material.

The capillary-active detection elements are preferably fixed partly on the carrier platform, while another part of the capillary-active detection elements protrudes freely movably into the test cassette. The fluid contact with the sample, which is located in the sample tray located deeper, is made possible by this technical design feature only. The downward motion of the capillary-active detection elements takes place by means of a rigid deflecting diaphragm as part of the housing upper part such that the feed of the carrier platform is transformed into a downward motion of the capillary-active detection elements, so that the latter will be in fluid contact with the sample when reaching the "sample contact" operating position. As an alternative, an external device may also extend into the test cassette in order to deflect the flexible part of the capillary-active detection elements downwardly. Another possibility is that the capillary-active detection elements are connected in the mobile part to magnetic or metallic components in the form of a coating or lamination. Individual capillary-active detection elements or a plurality of capillary-active detection elements can thus be specifically deflected into the sample tray by means of an opposite magnetic pole or an electromagnet, which are specifically positioned outside the test cassette. Conversely, an existing fluid contact is interrupted at the moment at which the carrier platform is again moved into the rear position, or the device protruding from the outside is withdrawn or the magnetic or electromagnetic force is abolished and the capillary-active detection elements are pulled out of the sample fluid as a consequence.

According to a preferred embodiment, the capillary-active detection elements may have different lengths, so that it is possible to dip some capillary-active detection elements into the sample fluid over the path of displacement of the carrier platform, while others are not yet dipped. Analytes contained in the samples can be addressed selectively in this way depending on their incubation time and subsequently determined by the fluid contact with certain capillary-active detection elements being made possible, while other analytes will be brought into contact with the fluid only later, after a longer incubation with other capillary-active detection elements. After the fluid contact has taken place, the capillary-active detection elements become saturated with sample fluid. As a consequence of the fluid flow through the channels of the carrier materials, additional reagents can be solubilized for the detection reaction of the analytes. Reaction or complexing will take place with the analyte or analytes that are intercepted selectively farther upstream in one or more detection zones. The signals in the detection zones may be read visually, optically, magnetically or electrically, depending on the marker used.

The analysis in the test cassette is preceded by the sampling of a solid or fluid matrix and optionally by sample preparation by the addition of or mixing with suitable reactants. This may take place separately with corresponding sampling means. In any case, a fluid extract of the sample or a fluid sample itself is filled into the sample opening of the cassette. A sampling device that complements the test cassette by a module-like attachment above the sample opening, as is described in DE 103 28 984 B4, is especially preferred. The test cassette is used in this case as a handle during the application of the sampler by wiping on surfaces or by dipping into fluids, for example, body fluids or contact sampling of body fluids on the skin or mucosa. The sample is taken up now in a porous solid, preferably taken up by capillary forces, if the sample is a fluid. The porous solid may consist of foamed materials, pressed or bonded fibers, or sintered plastics, metals or ceramics.

Subsequent to manual sampling of a solid or a fluid, which is carried out separately or with an adapter, which is linked to the test cassette, the sample obtained with a porous sample collector is transferred into the test cassette by means of an external actuator. This is preferably carried out by generating an overpressure with a penetrating reagent fluid, which, as is described in DE 103 28 984 B4, produces an extract or filtrate, which contains part of the sample fluid. This fluid, which contains the sample, is delivered by means of the overpressure applied through the porous reagent depot in the upper part of the cassette into the sample reservoir in the interior of the test cassette. Reagent is now taken up from the reagent depot, it is distributed in the sample fluid and reacts with the analyte. The reservoir for the fluid sample can be tempered by the lower bottom of the housing independently from the ambient temperature and reaches a desired temperature for the incubation of the sample with the reagent within a few minutes. Capillary-active detection elements, which are immobilized on the carrier platform, are brought, after a few minutes of incubation, from the inoperative position into the "sample contact" operating position for dipping into the sample fluid by an actuator-controlled forward motion subsequent to the triggering of a release mechanism. The capillary-active detection elements become saturated with sample fluid within a few minutes. Depending on the design of the test process, more reagent is taken up, as a consequence of which the reaction of the analyte with the reagent will take place, and the trapping reaction, which yields a measurable, for example, optical signal, will subsequently take place on the detection and control zones of the capillary-active detection elements. The carrier platform can be pulled out of the housing of the test cassette at any time into another operating position in an actuator-controlled manner in order to measure the signals generated in a device-based manner. The fluid contact with the sample fluid is now automatically interrupted. A downstream external logic unit decides, by means of stored algorithms, whether the reaction on the particular capillary-active detection element has already been concluded. If further fluid contact is needed or the sample fluid is to be bound completely by absorption, the carrier platform can be returned into the "sample contact" operating position. It is also possible to bring the carrier platform again into the inoperative position, into a final, locked state, in order to prevent further, unauthorized manipulations on the capillary-active detection elements and to bring the test cassette into a state in which it is ready for removal.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
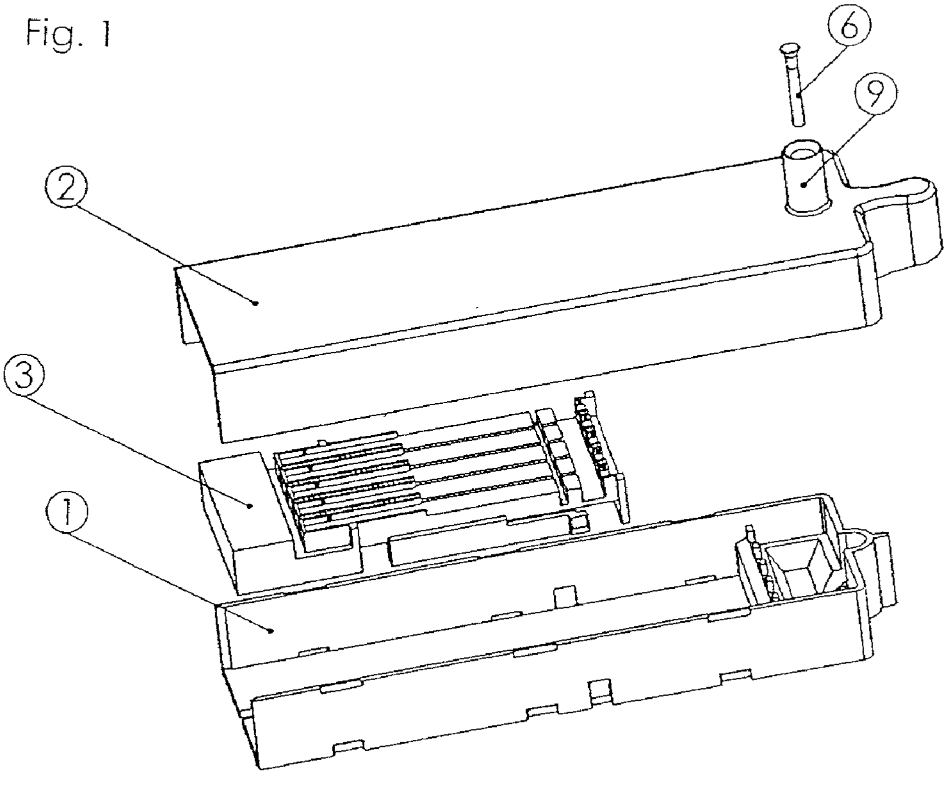
FIG. 1 is a perspective exploded view of a test cassette.

Referring to the drawings in particular, FIG. 1 shows an exploded view of an embodiment of a test cassette for immunochemical capillary-active detection elements, which will hereinafter be called "test strips" for simplicity's sake. The device is used, for example, to carry out immunochemical tests from saliva samples. A carrier platform 3 is integrated in the test cassette. All three elements shown, namely, the lower part 1, the upper part 2 and the carrier platform 3, can be manufactured by standard shaping or processing processes. Thermoplastic plastics, which can be processed according to the injection molding process, are preferably used. The test cassette comprises the three elements, namely, the upper part 2 with a sample opening 9, designed as a plug-type connection here, a reagent depot component 6, which is fastened in the sample opening 9 by press fit, and the lower part 1, which is combined with the upper part 2 by means of spring-loaded catches, and these components form a housing for a displaceable carrier platform 3. The carrier platform 3 is a means for stabilizing the position and for positioning test strips within and outside the test cassette for the different phases of a saliva analysis. Numerous functions, which are integrated within the test cassette, will be described below.

Figure 4:
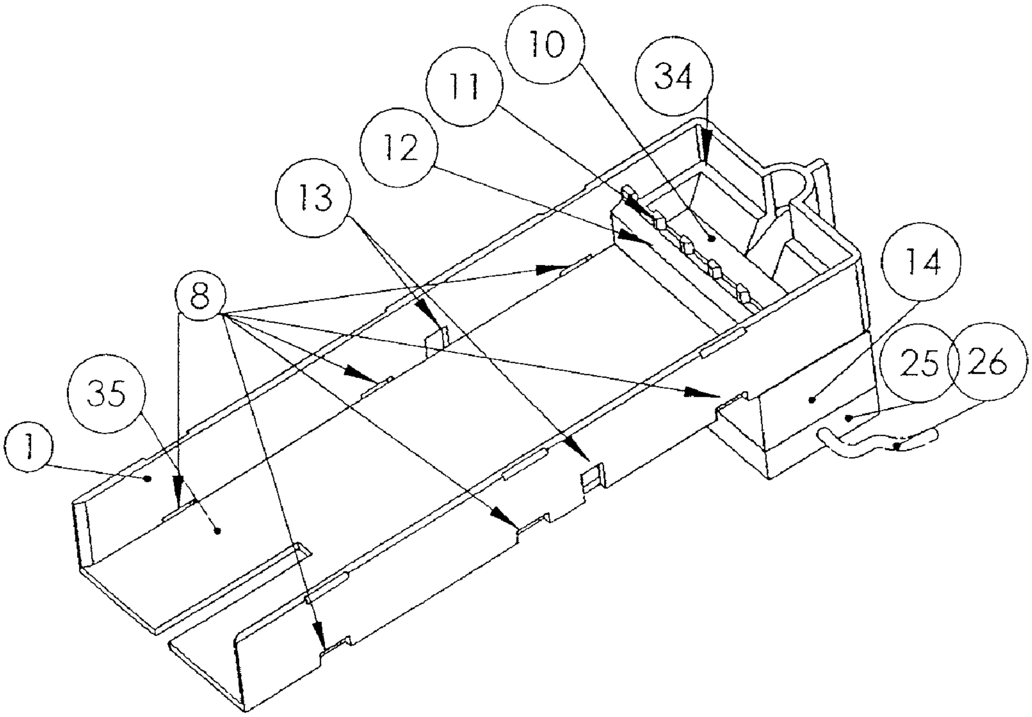
FIG. 4 is a perspective view of the lower part of the test cassette.

The test cassette is not in operation during the sample feed and is in a locked inoperative position, cf. FIG. 4. The test cassette is within a reading device, not being shown here, during the operation.

Figure 2:
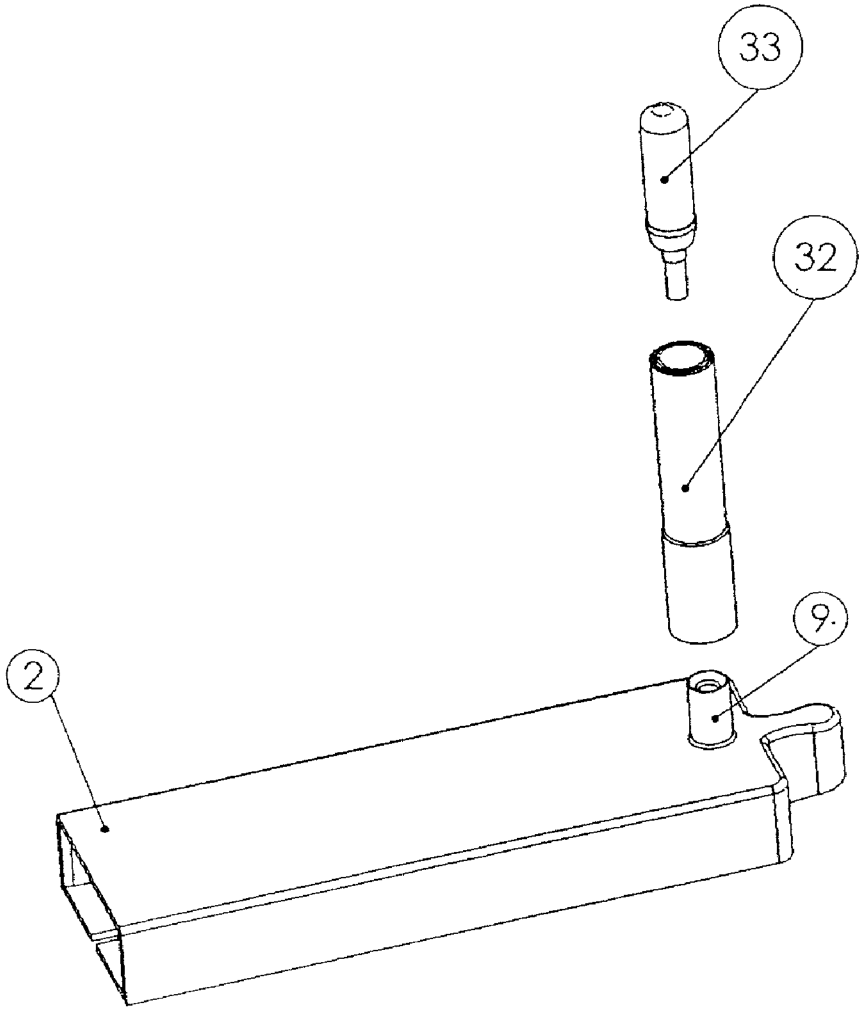
FIG. 2 is a perspective exploded view showing a test cassette with an optional sampling module.

FIG. 2 shows the test cassette in connection with an optional sampling module, which is plugged onto the sample opening 9 and comprises a porous mouthpiece 33 for the autonomous sampling of saliva and a mouthpiece holder 32 as a support element for the mouthpiece 33, on the one hand, and as a connection element for transferring the sample into the test cassette, on the other hand, analogously to the device described in DE 103 28 984 B4.

Figure 3:
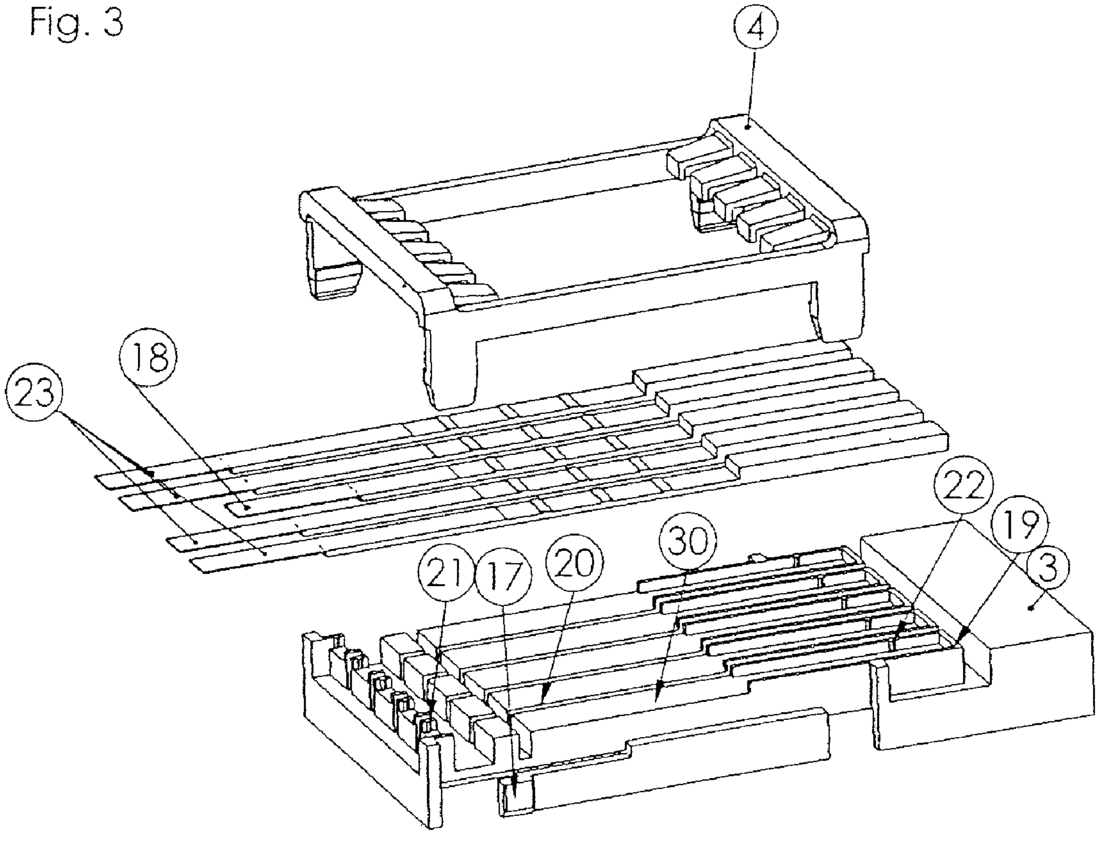
FIG. 3 is a perspective exploded view showing a carrier platform with test strips.

FIG. 3 shows a carrier platform 3 equipped with test strips 18, 23. The test strips 18, 23, which are potentially of different lengths, are fixed and aligned on the supports 30 of the carrier platform 3 by means of a clamp 4, which snaps into the carrier platform 3. The clamp 4 secures, moreover, the contacting of the nonwoven materials with the chromatographic membrane of the test strips 18, 23. By means of frame and clamping elements 19, 22 in the rear and webs 21 in the front, the test strips 18, 23 are positioned and guided in parallel to one another and to the test cassette. Gaps 20 on the carrier platform 3 between the individual support positions 30 ensure the physical separation of the test strips 18, 23 from one another and prevent fluid contact between the test strips 18, 23. Parts of the test strips 18, 23 project over the carrier platform 3. Since these are not supported in this area, the flexibility of the test strips 18, 23 leads, as will be explained in greater detail below, to the possibility of positioning them vertically.

The shape of the carrier platform 3 is adapted to the housing of the test cassette. A small clearance—due to technical reasons—between the carrier platform 3 and the housing of the test cassette makes possible the actuator-mediated linear mobility within the test cassette.

The test strips 18, 23 are 2 mm to 5 mm wide, consist of thin, absorbent, capillary porous layers, such as cellulose nitrate, nylon, polysulfone, and are often combined by an overlapping with fiber materials, typically glass fiber or cellulose nonwovens, which are backed by a flexible support layer consisting of a polymer, for example, a Mylar foil.

The test strips 18, 23 can be dipped into the sample fluid in such a way that they are controlled from the outside by the carrier platform 3 being deflected linearly by means of a motor and a gear mechanism. The test strips 18, 23 are dipped into the sample fluid by means of the deflecting structures 7, see FIG. 7, of the upper part 2. Sample fluid is taken up now by the test strips 18, 23 immediately.

Due to the different lengths of the test strips 18, 23, it is possible to dip some test strips 18, 23, while others are still located outside the tray. This may be necessary in case of the analysis of the sample fluid for different analytes, when these require different reaction times before they are contacted with the test strips 18, 23.

Figure 5:
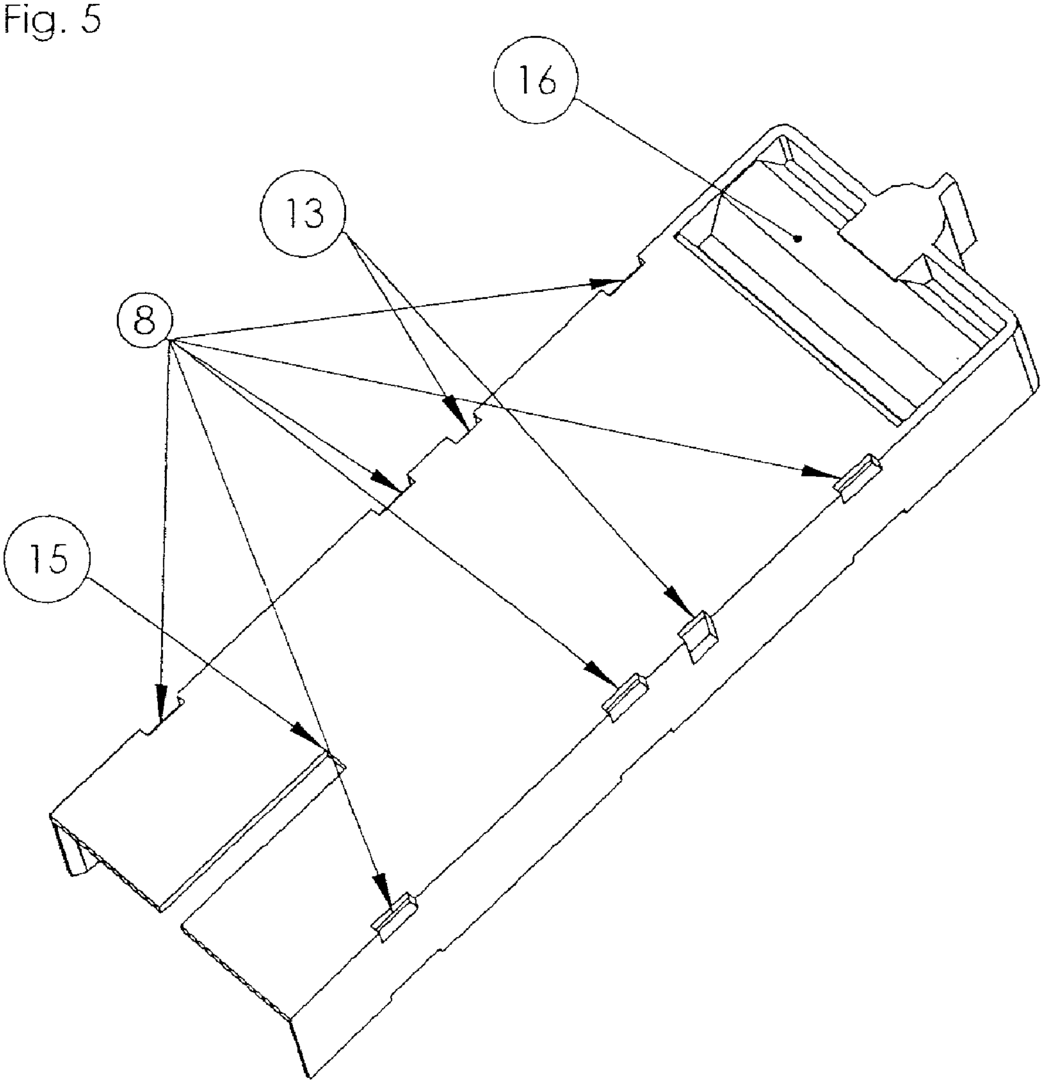
FIG. 5 is a perspective view of the lower part of the test cassette.

FIGS. 4 and 5 show two views of the lower part 1 of the test cassette. The bottom of the lower part 1 is divided into the sliding shaft 35 for a displaceable carrier platform 3, see also FIG. 3, and a sample tray 10 acting as a reservoir for the sample fluid. The sample tray 10 is a compartment designed as a sink within the lower part 1, in which up to 0.8 mL of sample fluid can be taken up. An overflow edge 34, which is used for a limited compensation of the fluid level in case of oblique position, is located above the sample tray 10. The sample tray 10 can be tempered by the lower bottom 16 via a contact body with higher thermal conductivity, especially an aluminum block 14, connected to a thermoelectric component, for example, a Peltier element 25, which is connected to a power source 26. The sample tray 10 is delimited from the sliding shaft 35 by means of a partition, which acts as a front stop for the displaceable carrier platform 3, with guide webs 11 and with a guide ramp 12 for securing the positioning of the test strips 18, 23 projecting over the carrier platform.

Defined openings 8 are provided in the lower part 1 of the housing for locking the lower part 1 with the upper part 2, for locking the displaceable carrier platform 3 with the lower part 1 in the inoperative position (see also FIG. 7) and for granting access for a gripper for the carrier platform 3 on the part of a reading and evaluating device 40.

The test cassette is designed such that it is open on the rear side in order to make it possible to pull the carrier platform 3 out of the test cassette.

Figure 6:
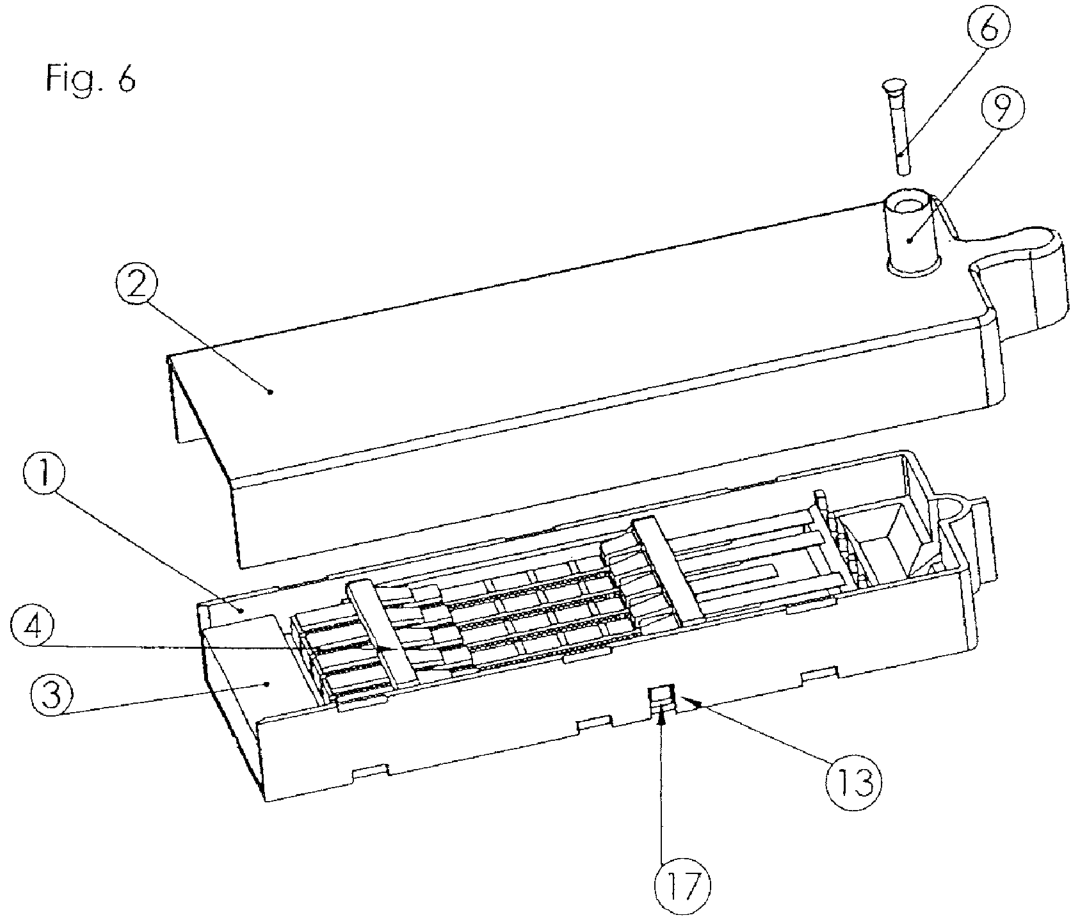
FIG. 6 is a perspective exploded view of the test cassette in the inoperative position.

FIG. 6 shows an exploded view of the test cassette in the inoperative position. A spring-loaded lever 17, which is also locked in the inoperative position with a hole 13 in the lower part 1 of the test cassette, is located on the side of the carrier platform 3. The carrier platform 3 ends flush with the housing of the test cassette in this position and cannot be detached without special interventions of the external reading and evaluating device 40. The interior of the test cassette is thus protected from access and from rain and dirt in the inoperative position.

Figure 7:
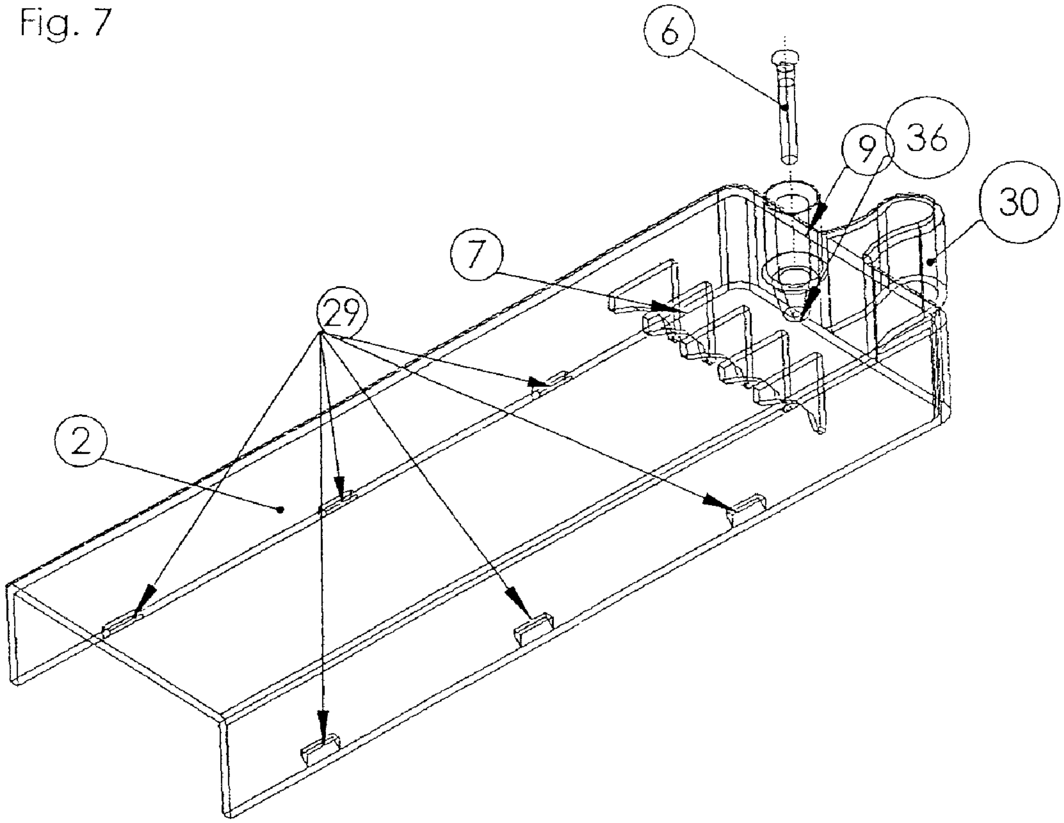
FIG. 7 is a perspective transparent view showing a test cassette upper part with hidden edges and showing a reagent depot component aligned for insertion.

FIG. 7 shows an embodiment of the upper part 2 of the test cassette with hidden edges. The upper part of the test cassette contains spring-loaded catches 29, which can be locked in corresponding openings 8 in the described lower part 1 to form a housing for the carrier platform 3 (see also FIG. 3) and the sample tray 10. Deflecting arcs (deflecting elements) 7, which interact with the partially projecting test strips 18, 23 fixed on the carrier platform 3 by vertically deflecting, via their radii of curvature, the flexible part of the test strips 18, 23 during a horizontal forward motion of the carrier platform 3 into the sample tray 10, are located above the sample tray 10 of the lower part 1. In addition, the upper part 2 has a sample opening 9, which is shaped as a spout in this embodiment and makes possible both the plug-type connection with a sampling module and the direct supply of a fluid sample into the sample tray 10. The sample opening 9 ensures the passage of the fluid sample into the sample tray 10 by ending just above the bottom of the sample tray 10. A reagent depot component 6, preferably a porous carrier consisting of a thermoplastic polymer, which is coated with special markers and/or conjugates of markers and selective recognizing structures for the analyte and/or chemicals conditioning the sample, may be located in the sample opening 9.

In an especially preferred embodiment, which brings about the transfer of the sample from a mouthpiece into the sample tray 10 according to DE 103 28 984 B4 by applying a hydrostatic pressure, the reagent depot component 6 constricts the cross section of the sample opening 9 to such an extent that perfusion of the reagent carrier and consequently flushing out of the coated reagents into the sample fluid will take place. An additional reduction of the cross section of the sample opening 9 toward the nozzle 36 at the part facing the sample tray 10 ensures an increase in the flow of sample into the sample tray 10 in favor of convective mixing of the sample with the flushed-out reagents.

Furthermore, a handle 30, which makes possible the manual positioning of the test cassette in a reading/evaluating device 40, is located on the narrow side of the upper part 2 of the test cassette.

Figure 8:
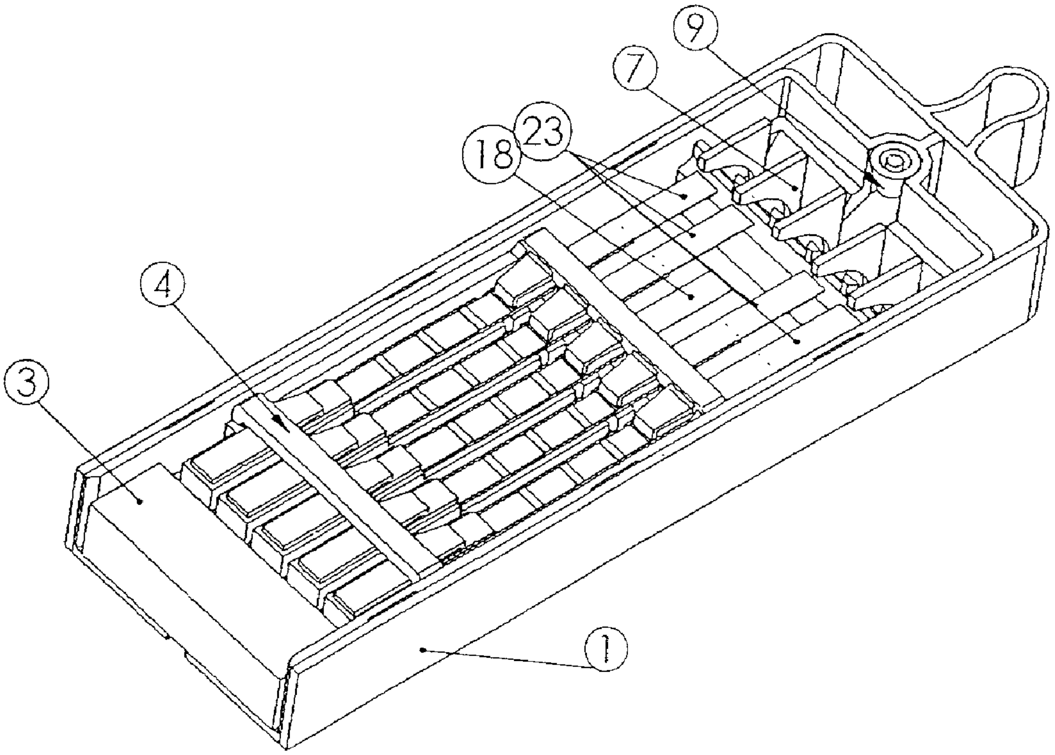
FIG. 8 is a perspective sectional view of the test cassette in the locked inoperative state.

Subsequent to the sampling of saliva, the test cassette with the combined sampling module is inserted into a corresponding reading/evaluating device 40. The test cassette is in the locked inoperative position according to FIG. 8. After the processing of the saliva sample has been carried out according to DE 103 28 984 B4, sample fluid mixed with reagent is located in the sample tray 10.

Depending on the ambient temperature, which may inhibit or even suppress a chemical or biochemical reaction, it may be necessary to temper the sample fluid between 15° C. and 25° C. directly through the lower bottom of the sample tray 10.

Within the framework of incubation, the saliva sample with a washed-in reagent may remain in the sample tray 10 for a few minutes before the reading/evaluating device 40 heads for actuator-mediated operating positions as relative positions of the test strips 18, 23 within and outside the test cassette. The carrier platform 3 now slides to different positions within the test cassette.

Mechanical elements of the reading/writing device 40 extend for this purpose into the test cassette and act to release the locked carrier platform 3, on the one hand, and, on the other hand, to transmit the forward or rearward pushing of the actuator to the carrier platform 3 within the test cassette. The mechanical components within the reading/evaluating device 40 may be grippers or spring-loaded catches, which are in positive-locking connection with the cassette and are connected to a stepping motor or linear motor via a gear mechanism and a linkage. The test strips 18, 23 can be dipped into the sample fluid in such a way that they are controlled from the outside by the carrier platform 3 being deflected linearly by means of a motor and a gear mechanism. The test strips 18, 23 are dipped into the sample fluid by means of the deflecting structures of the upper part 2 of the housing. Sample fluid is now taken up directly by the test strips 18, 23.

Figure 9:
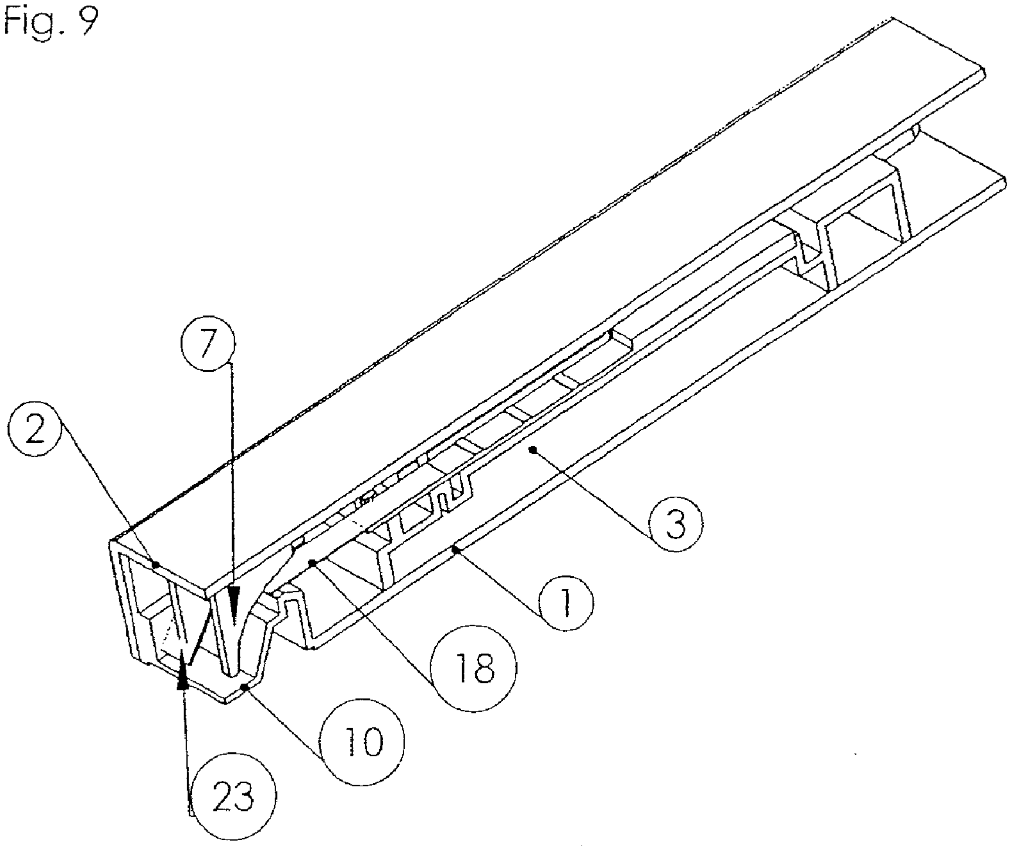
FIG. 9 is a perspective sectional view of the test cassette in a first operating position.

The sectional view of the test cassette shown in FIG. 9 shows the first "sample contact" operating position. The carrier platform 3 was pushed somewhat in the direction of the sample tray 10.

Due to the different lengths of the test strips 18, 23, it is possible to dip some test strips 18, 23 while others are still located outside the sample tray 10. This may be necessary in case of the analysis of the sample fluid for different analytes when these require different reaction times before they are brought to the analytical pathway, the test strips 18, 23. A first test strip 23 is already dipped into the sample tray 10 by means of the deflecting arc 7 of the cassette upper part 2. Fluid contact will become established in this manner between the test strip 23, and the saliva sample solution in the filled state. This test strip 23 will independently take up saliva sample solution as a consequence of the capillary forces of the microporous test strips. The fluid front passes over further depot zones and detection zones on the test strips 18, 23, in which analyte complexes will be intercepted within a few minutes. At the same time, another test strip 18 continues to be located in the inoperative position outside the sample tray 10.

Figure 10:
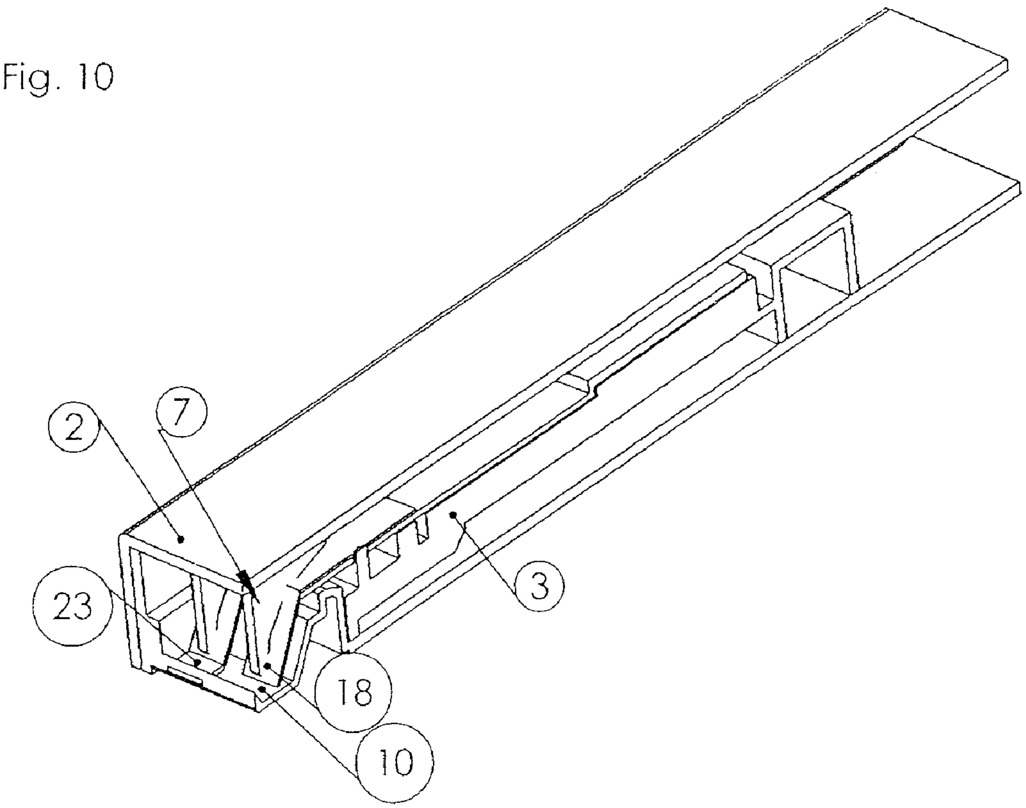
FIG. 10 is a perspective sectional view of the test cassette in a second operating position.

The sectional view of the test cassette shown in FIG. 10 shows a second "sample contact" operating position. The carrier platform 3 was pushed somewhat more in the direction of the sample tray 10 in relation to the operating position 1. Both test strips 18, 23 protrude deeply into the sample tray 10 in this operating position and can take up saliva sample solution. While one of the test strips 18, 23 just begins to take up sample solution, another test strip 23 has already been developed and could be read by the reading/evaluating device 40.

Figure 11:
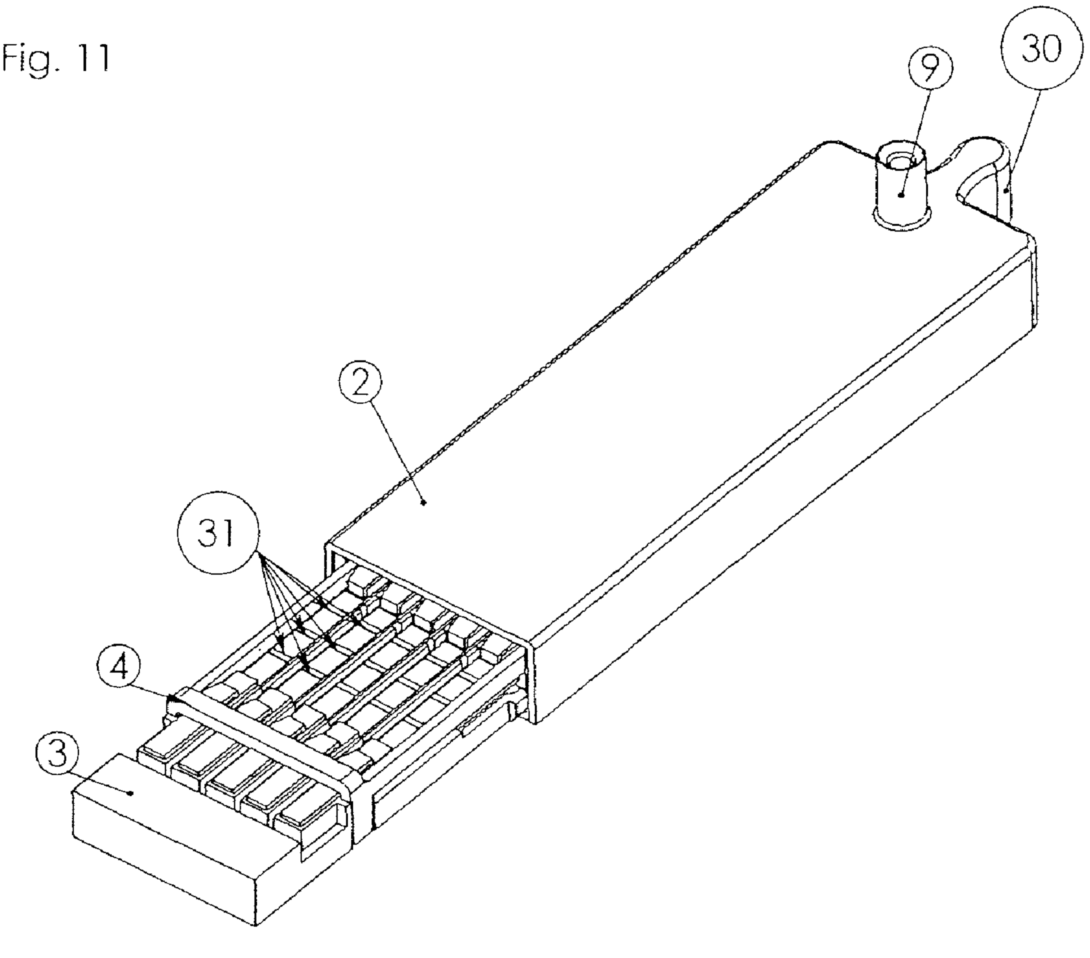
FIG. 11 is a perspective view showing the test cassette in a third operating position.

A third "reading position" operating position is shown in FIG. 11. Part of the carrier platform 3 is located outside the test cassette. The fluid contact with the reaction fluid is severed in this reading position. The test strips 18, 23 are accessible for an optical detector mimic means, which is located above the test strips. Signals appearing in the detection zones 31 of the test strips 18, 23 can be read, for example, by reflexometry by means of photosensitive components and interpreted by a logic unit implemented in the reading/evaluating device 40. Should the interpretation of the signals reveal that a test strip 18 or 23 has not been fully developed, because, e.g., the sample solution did not flow completely over the test strip 18 or 23 and insufficient signals were consequently measured, the carrier platform 3 can again be moved into the operating position 1 or 2 in order to re-establish fluid contact with the sample solution.

Figure 12:
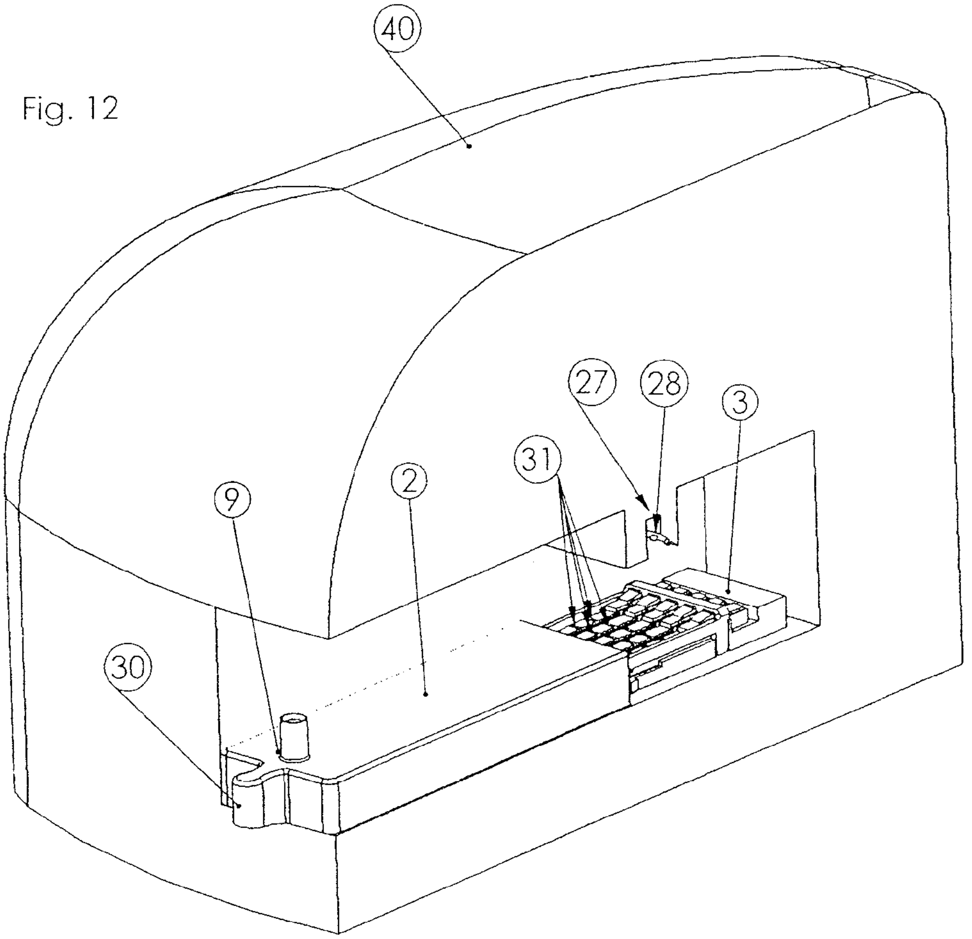
FIG. 12 is a perspective sectional view of the reading/evaluating device and showing a perspective view of the test cassette located therein.
Figure 13:
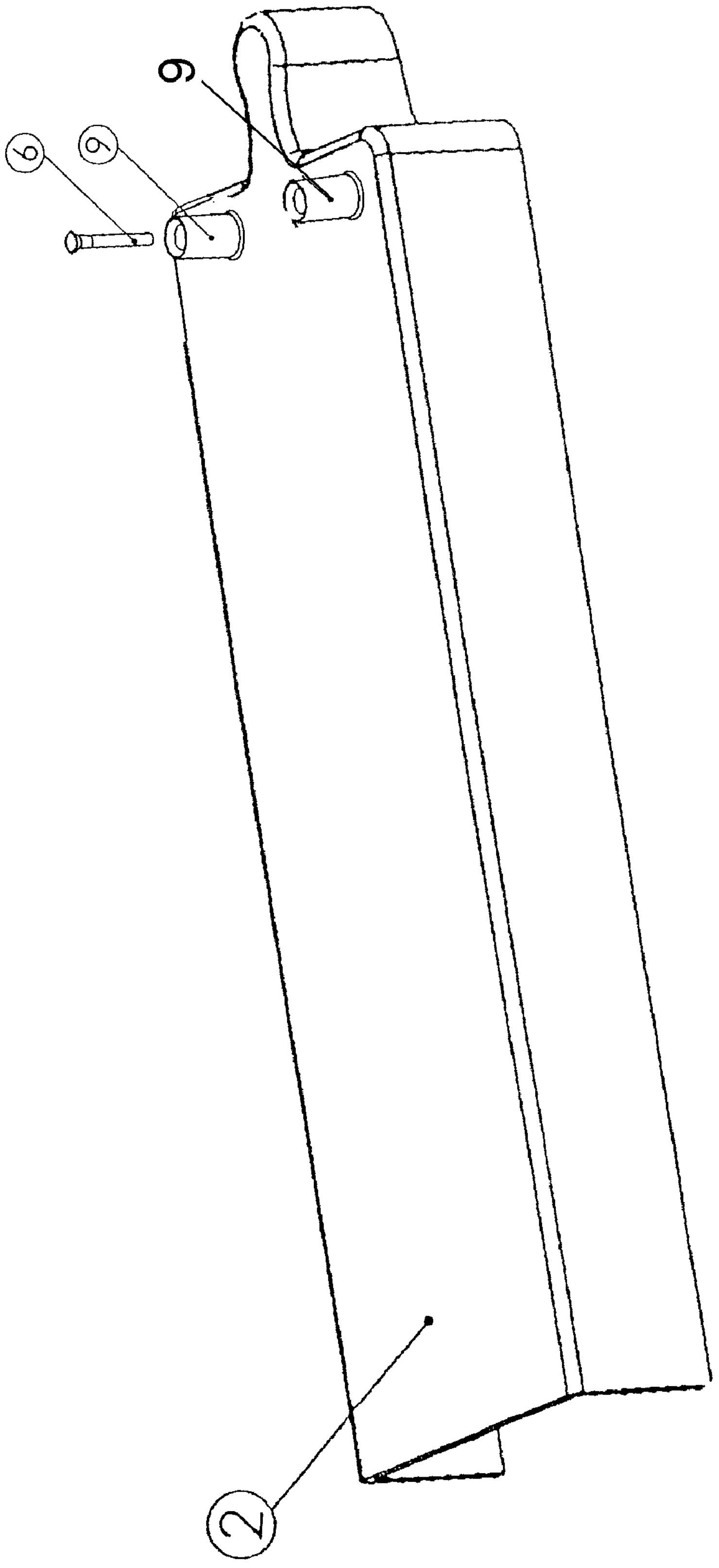
FIG. 13 is a perspective view of an embodiment with a plurality of inlet openings.

FIG. 12 shows the test cassette positioned in the reading/evaluating device 40. The carrier platform 3 is in the "reading "position" and is pulled out of the test cassette. The test strips are irradiated by an LED device. The absorption of the irradiated light in the detection zones 31 of the test strips 18, 23 is imaged and measured in an optical aperture 27.

The test cassette with optional sampling module (see FIG. 2) according to DE 103 28 984 B4 is used to detect drugs from saliva. The test subject holds the test cassette in his hand such that the sampling module (see FIG. 2) can be inserted into the mouth. The hydrophilic mouthpiece 33 is exposed in the mouth to the saliva, which is taken up as a consequence of the capillary porous structure of the mouthpiece 33. The test cassette with the sampling module (see FIG. 2) is then placed into the reading/evaluating device 40. All further process steps are initiated automatically by this device.

Part of the saliva obtained is now delivered from the mouthpiece 33 into the sample tray 10 by means of a pressure applied from the outside and a conditioning fluid fed from the reading/evaluating device 40 and mixed at the same time with an immunochemical marker, which was flushed out of the reagent depot component 6. The conditioned sample is tempered, if necessary, depending on the ambient temperature in the sample tray 10 by coupling a Peltier element 25, which is in contact with the sampler tray 10 on the outside, and subsequently incubated. The substances contained in the saliva, namely, amphetamine, methamphetamine, cocaine, opiates, benzodiazepines, as well as tetrahydrocannabinol, are taken up from the sample thus prepared and tempered by means of immunochemical test strips 18, 23, which are dipped into the sample fluid by means of the displaceable carrier platform 3 and the deflecting arcs 7, and subsequently detected in an immunochemical trapping reaction via the formation of gold colloid-labeled immunocomplexes on the detection zones 31 of the immunochemical test strips 18, 23. The intensity of the linear signals thus formed from immunocomplex markers is measured by reflexometry by means of the reading/evaluating device 40 after the carrier platform 3 has been pulled out into a reading position (see FIGS. 11, 12) and correlated with a corresponding drug concentration.

While specific embodiments of the invention have been shown and described in detail to illustrate the application of the principles of the invention, it will be understood that the invention may be embodied otherwise without departing from such principles.

What is claimed is:

1. A process for detecting analytes from fluid samples by means of a test cassette, the process comprising:
- providing a housing with an inlet opening and with a reservoir for receiving a fluid sample with the analyte;
- providing a separate carrier platform, which can be displaced horizontally in said housing selectively toward, and selectively away from, said reservoir;
- providing a plurality of flexible, strip-like capillary-active detection elements, for analytes, on the carrier platform in the housing;
- inserting a fluid sample into the reservoir in the housing of the test cassette;
- providing a reading/evaluating device;
- placing said housing with said carrier platform in a reading/evaluating device;
- said reading/evaluating device selectively moving said carrier platform inside said housing from an inoperative position toward said reservoir to deflect the detection elements such that the detection elements dip into the reservoir for receiving the fluid sample;
- said reading/evaluating device selectively moving said carrier platform away from said reservoir to remove the detection elements from the reservoir and arrange said carrier platform in a reading/evaluating position; and
- measuring a biochemical detection reaction by means of said reading/evaluating device on the capillary-active detection elements in said reading/evaluating position to determine the concentration of the analytes.

2. A test cassette system for the detection of analytes from fluid samples, the system comprising:
- a housing with an inlet opening and with a reservoir for receiving a fluid sample with the analyte;
- a separate carrier platform selectively movably arranged in said housing in a direction selectively toward said reservoir, and selectively away from said reservoir;
- a carrier platform strip mount for supporting one or more flexible, strip-like capillary-active detection elements; and
- deflection means for deflecting the capillary-active detection elements into said reservoir;
- a reading/evaluating device for reading/evaluating the detection elements in a reading/evaluating position, said reading/evaluating device receiving said housing and said carrier platform, said reading/evaluating device including an actuator selectively moving said carrier platform relative to said housing in a direction selectively toward said reservoir, and selectively away from said reservoir.

3. A system in accordance with claim 2, wherein said deflection means comprises defecting elements connected to said housing and a positioning of said carrier platform in said housing allowing movement of said carrier platform relative to said housing whereby motion of said carrier platform brings about a vertical deflection of the flexible and capillary-active detection elements into said reservoir.

4. A system in accordance with claim 2, wherein:
- said actuator and said deflecting means cooperate to have movement of said carrier platform deflect the capillary-active detection elements into, and out of, said reservoir while said carrier platform is inside said housing.

5. A system in accordance with claim 4, wherein:

said actuator selectively moves said carrier platform between a sample position where a set of the capillary-active detection elements are deflected into said reservoir, and said reading position where said reading/evaluating device reads/evaluates the capillary-active detection elements.

6. A system in accordance with claim 5, wherein:

said actuator selectively moves said carrier platform to another sample position, where another set of the capillary-active detection elements are deflected into said reservoir.

7. A system in accordance with claim 2, wherein:

said deflection means selectively moves the detection elements into and out of said reservoir.

8. A system in accordance with claim 6, wherein:

said actuator moves said carrier platform between said sample position, said another sample position, and said reading/evaluating position to have the different sets of detection elements be in said reservoir for different amounts of time.

9. A system in accordance with claim 2, wherein:

said housing and said carrier platform include guide structures for guiding the carrier platform with respect to said housing toward and away from said reservoir to move the detection elements into an out of the reservoir while said carrier is moving inside said housing.

10. A system in accordance with claim 2, further comprising:

a temperature control device arranged adjacent to said reservoir for heating and cooling a temperature of a sample in said reservoir.

11. A system in accordance with claim 2, further comprising:

a locking structure on said housing and said carrier platform for selectively locking said carrier platform in an inoperative position with respect to said housing;

unlocking structure in said reading/evaluating device for selectively unlocking said locking structure when said housing and said carrier platform are connected with said reading/evaluating device.

* * * * *